United States Patent [19]

Highnote

[11] 4,096,535

[45] Jun. 20, 1978

[54] ROTARY TRANSFORMER WITH UNIQUE PHYSICAL AND ELECTRICAL CHARACTERISTICS

[75] Inventor: Jerry Lee Highnote, Boulder, Colo.

[73] Assignee: International Business Machines Corporation, Armonk, N.Y.

[21] Appl. No.: 661,232

[22] Filed: Feb. 25, 1976

[51] Int. Cl.[2] .................... G11B 5/52

[52] U.S. Cl. .................... 360/84; 360/108

[58] Field of Search .................... 360/84, 108, 119, 123, 360/125, 64

[56] References Cited

U.S. PATENT DOCUMENTS

| | | | |
|---|---|---|---|
| 3,763,327 | 10/1973 | Hescher | 360/108 |
| 3,823,415 | 7/1974 | Fisher et al. | 360/108 |

OTHER PUBLICATIONS

IBM Technical Disclosure Bulletin, vol. 18, No. 1, Jun. 1975, p. 47.

IBM Technical Disclosure Bulletin, vol. 15, No. 2, Jul. 1972, p. 363.

*Primary Examiner*—John H. Wolff

*Attorney, Agent, or Firm*—Joscelyn G. Cockburn

[57] ABSTRACT

A unique concentric rotary transformer for use in a rotating head tape transport, wherein a length of tape is positioned relative to the rotating head and data is recorded and/or reproduced therefrom, is disclosed. The rotary transformer comprises two assemblies one of which rotates relative to the other and thereby transmits electrical signals. Each assembly includes a ferrite cylindrical core piece with two grooves machined in the core piece. The grooves are axially and circumferentially displaced along a longitudinal axis of said core piece. A continuous coil with two legs, is positioned within the grooves of the core piece whereat mutual inductances generated in the ferrite core by each leg of the coil effectuate signal transfer across the transformer interface.

15 Claims, 12 Drawing Figures

ROTARY TRANSFORMER WITH UNIQUE PHYSICAL AND ELECTRICAL CHARACTERISTICS

BACKGROUND OF THE INVENTION

I. Field of the Invention

The present invention relates to a tape transport wherein data is transmitted in the form of electrical signals between a stationary assembly and a rotating assembly of said transport. More specifically, the invention relates to the interface which effectuates data transfer between the assemblies.

II. Prior Art

The use of a rotating head device for recording and/or reproducing data from magnetic tape-like recording media is well known in the prior art. Generally a head wheel carrying one or more magnetic heads are positioned relative to a length of recording media. A thin film of air may or may not separate the media from the head wheel and the magnetic heads. However, in the type of device where the magnetic head/tape interface is separated by an air film the film is of sufficient thinness so as not to impede the recording and/or reproduction of data on/from the media.

To facilitate media support two mandrel halves are arranged in axial alignment to abut the rotating head wheel. The length of media which is associated with the rotating head wheel wraps the mandrel halves in a helical manner for support. As the magnetic heads are rotated in a circular orbit by the head wheel closely adjacent oblique data tracks are recorded on the media. Alternately, if the apparatus is in a reproduction mode pre-recorded data are reproduced from the oblique tracks. More detailed discussion of the above described rotating head device may be found in U.S. Pat. Nos. 3,845,500, issued to Gary Hart and assigned to IBM; 3,867,725, issued to Donovan M. Janssen et al., and assigned to IBM; 3,823,415, issued to Gene A. Fisher et al. and assigned to IBM and 3,840,894, issued to P. J. Arseneault and assigned to IBM.

In order to transmit data, in the form of electrical signals, from the rotatable head wheel to the stationary portion of the tape transport sliding ring contacts also known as slip rings, with contact brushes or else mercury contacts are used in the prior art. However, due to machine failure, interference, and maintenance problems the use of the afore-mentioned type of transmission interface has been discontinued for the transmission of high speed electrical signals. Instead internal inductive repeaters or transformers are used almost exclusively.

One type of transformer includes magnetic cores with annular windings, said cores are disposed in pairs concentrically and in space relationship with each other whereby one core is secured to a rotatable portion and the associated core is secured concentrically thereto on a fixed portion of the device or tape transport. Each pair of annular cores transmit signals to magnetic head or heads positioned on the rotor. Each of the annular cores has a coil or winding positioned in a single groove, machined into the core. A general discussion of this type of concentric transformer is given and shown in U.S. Pat. No. 3,763,327.

The present invention relates to a concentric transformer of this type.

Although the prior art concentric transformer operates satisfactorily for its intended purposes it has several shortcomings which the present invention will improve significantly.

One of the drawbacks with the prior art concentric transformers is that the transformers are expensive and very difficult to assemble. This drawback stems from the fact that in order to fabricate a prior art transformer a Printed Circuit (P.C.) coil is manufactured from a plurality of separate strands of copper wire. The strands of copper wire are laid down on a clear mylar backing using conventional P.C. technique. In order to form a continuous wire or coil the strands have to be soldered end to end, respectively. The desired number of turns is then fabricated from the continuous strand to form a coil and the coil is positioned within a groove machined within the periphery of the core. The task of soldering the individual strands is laborious, time consuming and therefore significantly increases the cost of the transformer.

As will be explained subsequently in describing the present invention, unless the aforementioned laborious method is practiced in manufacturing the coil, the fabricated transformer may not function in a satisfactory manner. Additional information on the aforementioned coil design may be obtained from an article entitled "Printed-Circuit Winding for Concentric Transformer", published in IBM Technical Disclosure Bulletin, Vol. 18, No. 1, June 1975, p. 47.

Another drawback with the prior art transformers is that said transformers arre susceptible to interference both as a radiating source and as a receiving source. To alleviate this problem shielding is required. Alternately, an optimum distance sufficient to reduce crosstalk has to be maintained between adjacent transformer pairs. As is well known to those skilled in the art in a rotating head device there is very little room for either shielding or spacing the separate transformers to reduce interference. As a result the performance of device using the prior art transformers is somewhat degradated.

SUMMARY OF THE INVENTION

The present invention overcomes the drawbacks found in the prior art by means of a rotary transformer with unique physical and electrical characteristics.

More specifically, the rotary transformer comprises a primary winding and a secondary winding. Each winding has a unique structure which includes a continuous printed circuit (P.C.) coil which is etched on a substrate to form two legs with each leg having a desired number of turns and separated from each other by a predetermined distance with solder pads attached to the ends of each leg.

In one embodiment of the invention the printed circuit coil has a center tap. Also, a third solder pad is attached to the center tap.

The core of the transformer is manufactured from ferrite cylindrical pieces. Two circular grooves are machined into the core piece. The grooves are axially and circumferentially displaced along the major axes of the ferrite cylindrical piece. The continuous P.C. coil with its two legs are then bonded with suitable adhesive into the grooves. One coil is positioned on the inside of one core piece and another coil is positioned on the outside of the other core piece. The coils are then spaced so that there is relative motion between the two core pieces which result in the transmission of the electrical signals.

In another feature of the invention holes are bored into the sides of the cylindrical core pieces. The ends of the P.C. coil are pushed through the holes to thereby establish transmitting and/or receiving terminals of the transformer.

The foregoing and other features, and advantages of the invention will be apparent from the following more particular description of the preferred embodiment of the invention as illustrated in the accompanying drawings.

DESCRIPTION OF THE PREFERRED EMBODIMENT

Figure 1A:
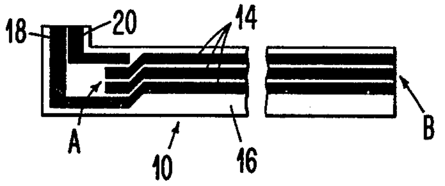
FIG. 1A and 1B depict a prior art P.C. coil and transformer and is useful in explaining the present invention.

For matter of brevity common numerals will be used to describe similar components in the drawings.

The transferring apparatus described herein can operate in any environment where electrical signals have to be transferred from a fixed assembly to a moving assembly or, in the alternative, can be employed as a component by which electrical signals are transferred from and/or to a rotating head device. Since the invention adopts itself very well to transmit electrical signals in a rotating head tape transport unit it is described within this environment.

Figure 1B:
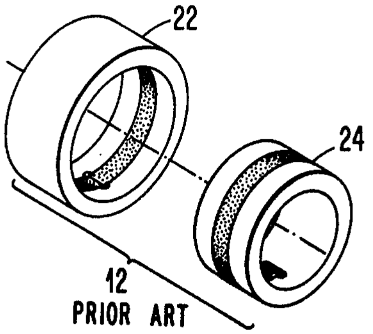

FIG. 1 depicts a prior art rotating concentric transformer for example, as shown in IBM Technical Disclosure Bulletin, Vol. 18, No. 1, June 1975, p. 47, and is useful in explaining the present invention. FIG. 1A depicts printed circuit coil 10 while FIG. 1B depicts assembled transformer 12. Printed circuit coil 10 includes a plurality of conducting strands 14 etched on a suitable backing 16. Printed circuit coil 10 has an input terminal 18 and an output terminal 20. To form a continuous strand ends A of conducting strands 14 has to be soldered to ends B of strands 14.

The transformer is then completed by machining single grooves in core pieces 22 and 24 respectively, and positioning coil 10 in these grooves.

Figure 2:
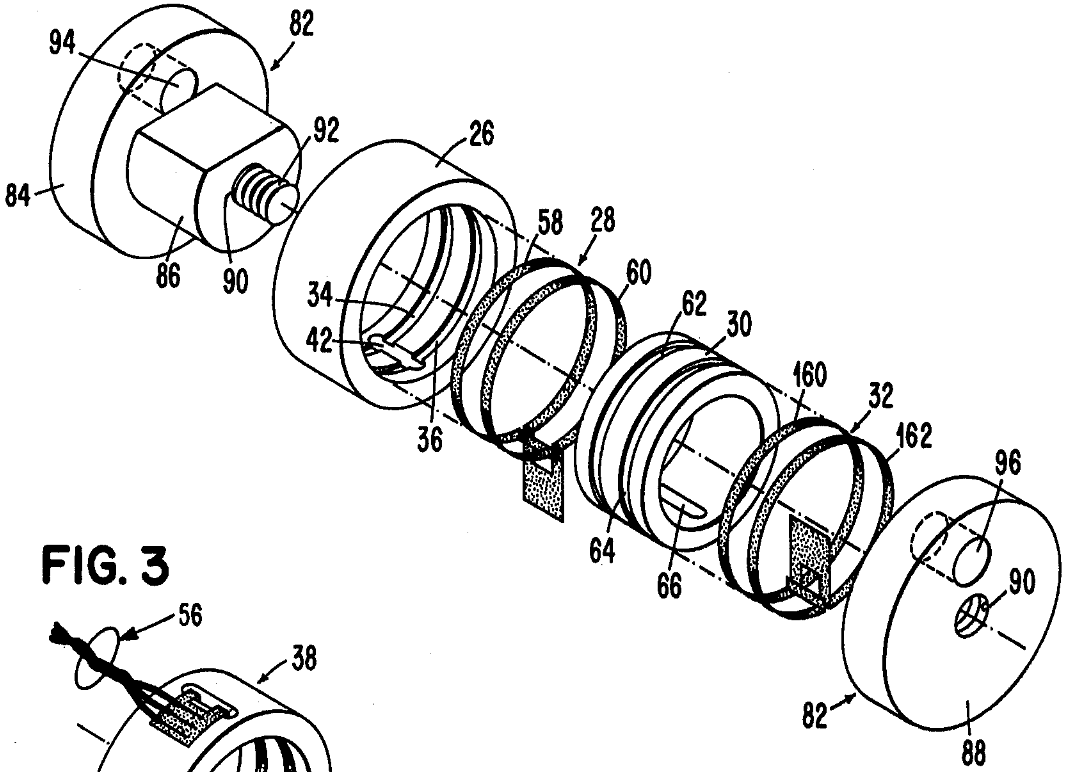
FIG. 2 shows a disassembled concentric transformer of the type disclosed in the present invention.

Referring now to FIG. 2 a pictorial view of the disassembled transformer comprising the present invention is disclosed. The transformer includes outer core piece 26, inner coil 28, inner core piece 30, and outer coil 32. Outer core piece 26 is fabricated from a piece of cylindrical ferrite material with grooves 34 and 36 machined into its inner surface. As will be explained subsequently, coil 28 is positioned within grooves 34 and 36 to form outer portion 38 of concentric rotary transformer 40.

It should be noted that outer core piece 26 need not be cylindrical in shape nor be manufactured from ferrite material, since it is within the skill of the art to use other types of magnetic core and obtain satisfactory results. The above description can therefore be regarded as explanatory rather than a limitation on the scope of the invention.

Still referring to FIG. 2 hole 42 is machined into the side section of outer core piece 26. Hole 42 is located axially to grooves 34 and 36 and connects grooves 34 and 36. As will be explained subsequently the terminal or ends of the transformer coil are pulled through this hole to establish transmitting and/or receiving stations.

Figure 3:
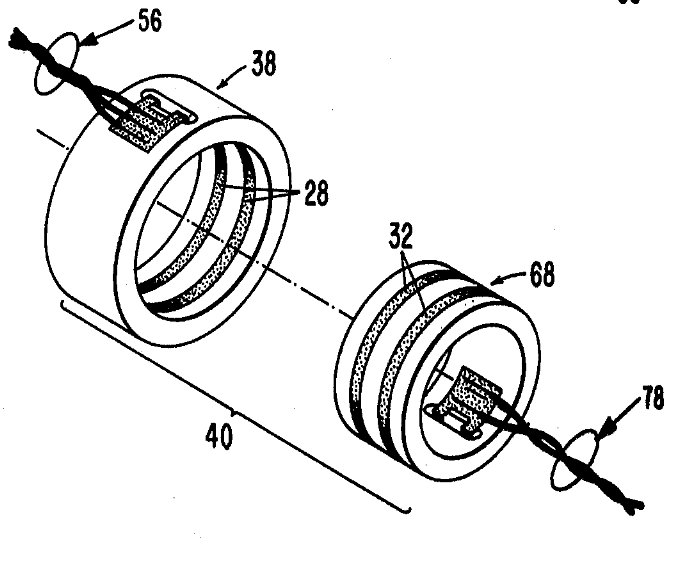
FIG. 3 depicts the concentric transformer with coil affixed to respective pole pieces.
Figure 4:
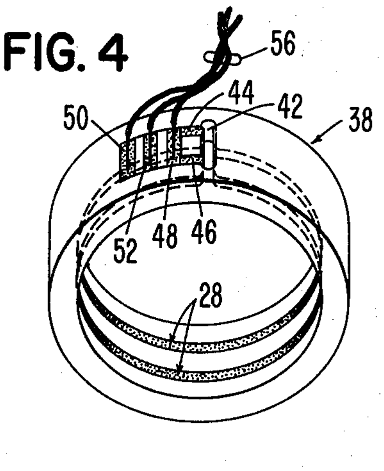
FIG. 4 depicts an end view of the outer core piece of the concentric transformer with coil access holes and coil ends passed through the access hole to establish a receiving or transmitting terminal.

Referring now to FIG. 4, an end view of outer portion 38 of transformer 40 (FIG. 3) is shown. As can be seen in the figure, hole 42 has terminal 44 and 46 passing therethrough. If inner coil 28 has a center tap then an additional terminal 48 will pass through hole 42. Solder pads 50 and 52 connect transmission means 56 to the inner coil 28. As will be explained subsequently, transmission means 56 may be transmission wires which transmit electrical signal from inner coil 28 to the other portion of the apparatus with which the transformer is used.

Referring still to FIG. 2, inner coil 28 has two branches 58 and 60, hereinafter referred to as legs 58 and 60, respectively. As will be explained subsequently, coil 28 comprises a continuous strand. Branches 58 and 60 are circumferentially and axially displaced from each other. Each leg may have any desired number of turns but for proper operation at least one turn is required.

Still referring to FIG. 2, inner core piece 30 is manufactured from a cylindrical piece of ferrite material with groove 62 and 64 machined into its outer surface. Hole 66 is machined into the side of inner core piece 30. Like hole 42, hole 66 is positioned axially to grooves 62 and 64 and connects both grooves. Of course, inner core piece 30 need not be manufactured from ferrite or with a cylindrical shape. As will be explained subsequently, outer coil 32 is attached to groove 60 and 62 by satisfactory adhesive means to thereby establish outer portion 68 (FIG. 3) of transformer 40. As it is with coil 28, coil 32 also includes leg 160 and leg 162. Each leg has a predetermined number of turns but at least one turn is required for proper operation.

Figure 5:
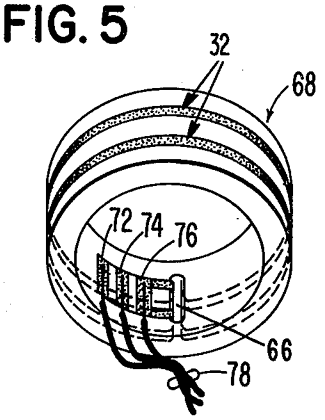
FIG. 5 depicts an end view of the inner core piece of the concentric transformer with coil access hole, and coil ends passed through the access hole to establish receiving or transmitting terminal.

Referring now to FIG. 5, terminal 72 and 74 of outer coil 32 is pulled through hole 66 to establish transmitting and/or receiving stations. If center tap is required on outer coil 32 a third terminal 76 will be added to coil 32. Solder pads are then deposited on each of the terminals 72, 74 and 78 respectively. Transmission means 78 is then connected to terminals 72, 74 and 76 by the solder pads. Transmission means 78 may be electrical conducting wires which transmit electrical signals to and from the rotating portion of the device.

Figure 6A:
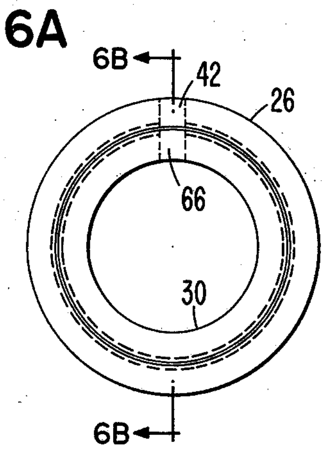
FIG. 6A depicts an end view of the concentric transformer showing inner and outer core pieces with coil access holes.
Figure 6B:
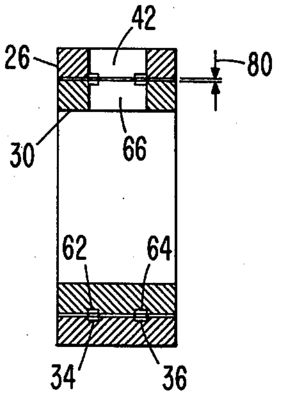
FIG. 6B depicts a cross-sectional view of the concentric transformer taken across FIG. 6A.

FIGS. 6A and 6B depict an end view and a cross-sectional view of concentric transformer 40 respectively. The sectional view in FIG. 6B is taken across FIG. 6A. FIG. 6A depicts access hole 42 and hole 66, respectively. FIG. 6B depicts coil grooves 34 and 36 of outer core piece 26 and grooves 62 and 64 of inner core piece 30. Air gap 80 is positioned between inner core piece 30 and outer core piece 26. The air gap clearance is such that inner core piece 30 with its coil 32 rotates relative to outer core piece 26 to thereby transmit electrical signals across the inductive interface. Referring again to FIG. 2 holding device 82 which may be used for carrying concentric transformer 40 is shown. Holding device 82, hereinafter called carrying means 82 comprises lower support means 84 hereinafter referred to as base 84, intermediate support means 86 which abuts base 84, upper support means 88, hereinafter called cover 88, which abuts the upper surface of the intermediate support means 86. In the preferred embodiment of this invention a centrally located hole 90 is drilled throughout each member of the holding device 82. Fastening means 92 is inserted in centrally located hole 90 to thereby hold the assembly together. In the preferred embodiment of this invention, centrally located hole 90 is threaded while fastening means 92 is an elongated screw.

In an alternative embodiment of the invention a second hole 94 is drilled in base 84. Second hole 94 is radially offsetted from centrally located hole 90 and is used for positioning transmission means from outer portion 38 of transformer 40. Likewise, a third hole 96 is positioned within cover 88 and function to carry transmission wires from inner portion 68 of transformer 40. In order to accomodate the terminal on inner portion 68 of transformer 40 a section of intermediate support means 86 is removed to thereby form a truncated intermediate section. Of course, it is within the skill of the art to rearrange the method of fastening holding device 82 without departing from the scope of this invention. For example, truncated intermediate support means 86 can be fabricated onto base 84.

In assembling the transformer onto carrying means 82, inner portion 68 of transformer 40 is fitted over truncated intermediate support means 86 with the terminal of inner portion 68 adjacent the truncated portion of intermediate support means 86. Outer portion 38 of transformer 40 is then fitted around inner portion 68. Any radial movement by transformer 40 is restricted by intermediate support means 86. Fastening means 92 is then inserted within threaded hole 90 and lightly torque until base 84 and cover 88 are securely fastened about the end portions of the outer and inner portion of transformer 40 to thereby restrict axial movement of said transformer.

Figure 7A:
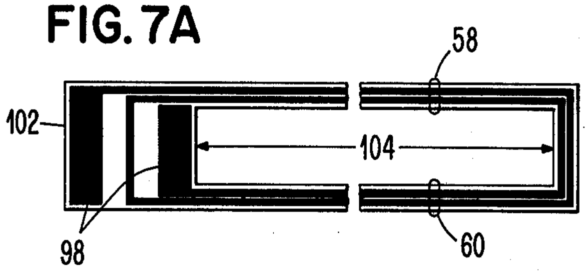
FIG. 7A depicts P.C. coil with solder pads.
Figure 7B:
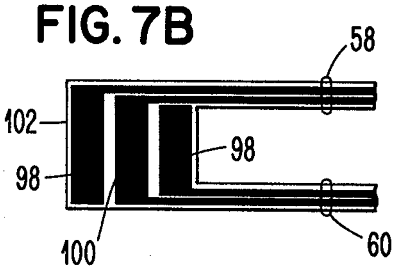
FIG. 7B depicts a center tap P.C. coil.

Referring now to FIG. 7 inner coil 28 and outer coil 32 are depicted in horizontal form. The coil includes leg 58 and leg 60. Each leg has a desired number of turns but at least one turn, and are displaced from each other. The coil is fabricated to form a continuous conductor with pads 98 attached to the ends of said coil. The pads 98 function as the transmitting and receiving terminal of the coil. In an alternative design, shown in FIG. 7B center tap 100 is fabricated on the coil. To manufacture the coil conventional printed circuit techniques are used. For example, the desired turns of conducting strands are etched from a copper-mylar laminate. Of course, other suitable backing can be used. Section 104 of the Mylar backing 102 is then removed and the coil is then rolled into the circular pattern as depicted in FIG. 2. To transmit electrical signals to and from the coil transmission means such as conducting wires 56 and 78 (FIG. 5) are attached to pad 98 by soldering.

Figure 8:
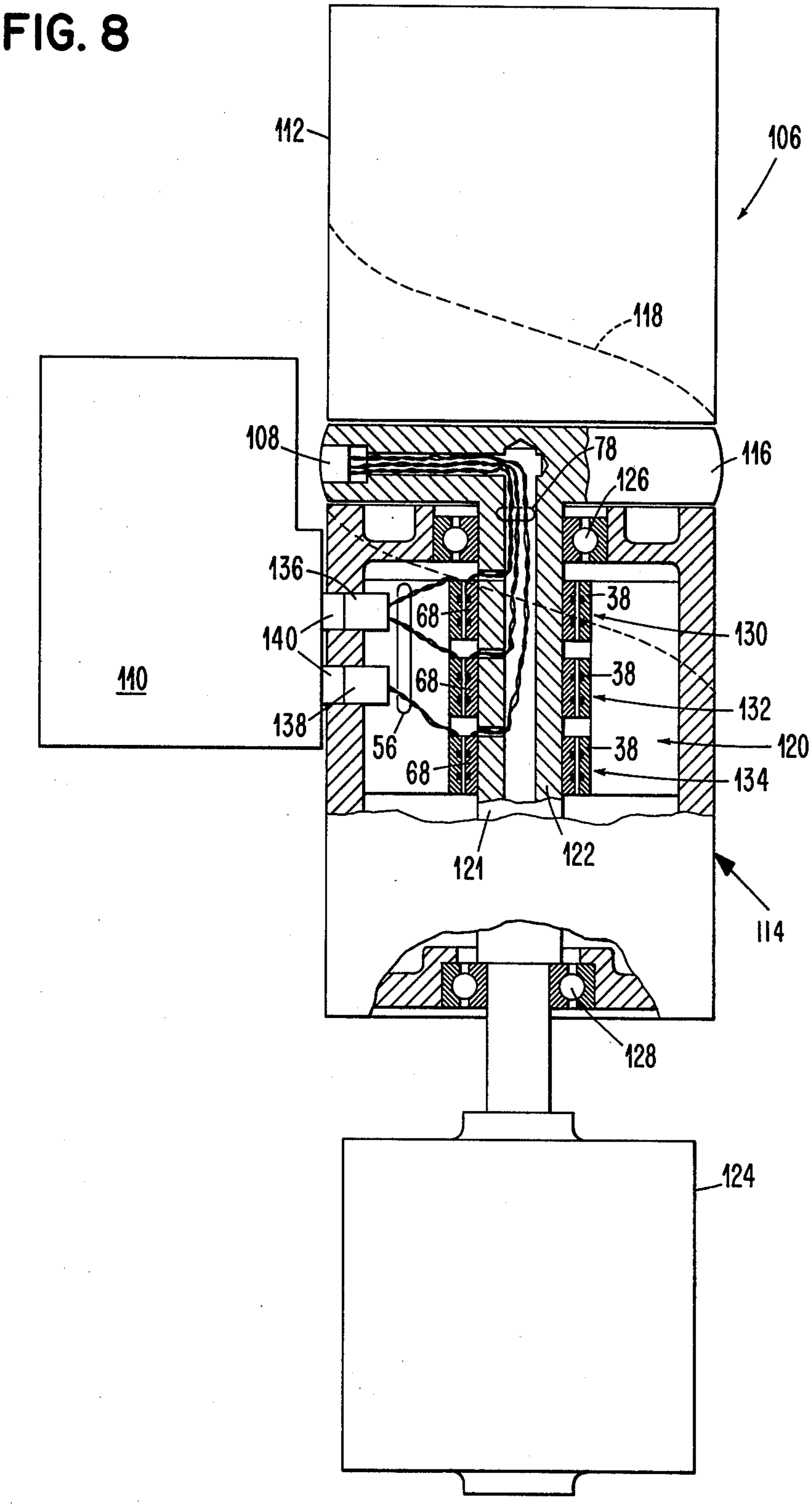
FIG. 8 depicts a perspective view of a rotating head tape transport wherein data is transmitted between the rotating section and the stationary section by the unique transformer of the present invention.

Referring now to FIG. 8 rotating head tape transport 106 is shown with transformers of the aforementioned type transmitting data between transducing means 108 and stationary circuit means 110. Rotating head tape transport 106 comprises upper mandrel half 112 and lower mandrel half 114. Both mandrel halves are axially displaced and in axial alignment. Rotating head wheel 116 is positioned between the mandrel halves. Transducing means 108 comprising of a read head, a write head, and an erase head are positioned on the periphery of head wheel 116. In order to read and/or write data a length of magnetic media 118 is positioned relative to the rotating head wheel 116 carrying the magnetic transducers. In one embodiment of this invention a thin film of air is generated between the transducing means and the media so that the rotating head flies relative to the media. Magnetic media 118 comprises of controlled tracks which are positioned lengthwise on the longitudinal edges of said media. Data tracks, or stripes are then positioned at an angle to the longitudinal edge of said magnetic media.

Lower mandrel half 114 comprises of fixed outer section 120 and movable inner section 122. Movable inner section 122 includes rotatable shaft 121 which connects rotating head wheel 116 with driving means 124. In order to transmit rotary motion from driving means 124 to the rotating head wheel shaft 121 is journaled within bearing means 126 and 128 respectively. Inner portion 68 of transformer 40 is attached to shaft 121 and rotates with said shaft. Although a single transformer may be used to transfer signals from a magnetic transducer in the preferred embodiment of this invention, three transformers namely, write transformer 130, read transformer 132 and erase transformer 134 is used. Each of the transformers is connected to the associated read, write or erase head via transmission means 78. Likewise, outer portion 38 of transformer 40 is attached to fixed outer section 120 of lower mandrel half 114. Electrical signals to and from the transformers 132, 130 and 134, respectively, are transmitted via transmission means 56. Terminals 136 and 138 are positioned within fixed outer section 120 of lower mandrel half 114. Stationary circuit means 110 is then connected via connecting means 140 to terminals 136 and 138 respectively. As inner section 68 of transformer 40 rotates with shaft 121 electrical signals are transmitted across the inductive interface from outer section 28 to inner section 68 or visa versa, of transformer 40.

OPERATION

In operation, data is written on or read from oblique tracks positioned on magnetic media 118 by transducing means 108. The transduced data is transmitted in the form of electrical signal via transmission means 78 to inner portions 68 of transformers 130, 132, and 134, respectively. The data is then transmitted across the inductive interface (that is, the air gap) of each transformer to their respective fixed portions. The data is then conducted via transmission means 56 to the stationary circuit means 110.

Figure 9:
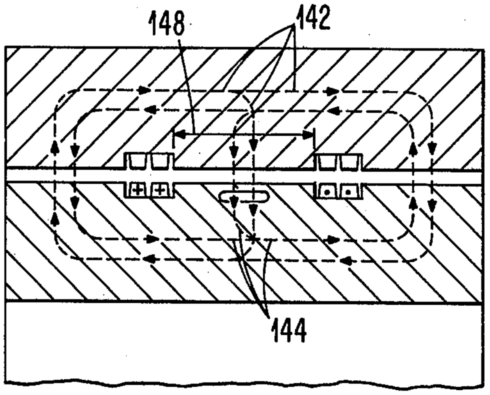
FIG. 9 shows a magnetic model of the transformer disclosed in the present invention.

Electrically the transformer operates as shown in FIG. 9. For analysis purposes the transformer is represented as two separate transformers in series which have flux paths 142 and 144, respectively. Total mutual inductance is the sum of the mutual inductance created by each transformer. The two windings share common pole piece 148 which is positioned between them. The common pole piece accounts for the effective operation of this unique transformer. The mutual inductance of each coil can be found by writing conventional expressions for the reluctance of each path.

The main advantages of the disclosed transformer over the aforementioned conventional single grooved transformer include ease of assembly. The coil is a continuous conductor and does not require fine soldering to complete. Solder pads for connecting cabling and/or wiring are fabricated as part of the coil.

Electrically, the unique transformer affords undesired magnetic coupling cancellation. Due to the double coil structure with currents flowing in opposite directions undesirable coupling is minimized. Also generation of magnetic fields which other potential receptors (for example, neighboring transformers) might receive is significantly minimized due to the cancelling effect of the flux generated in the coil.

While the invention has been particularly shown and described with reference to a preferred embodiment thereof it will be understood by those skilled in the art that various changes in form and details may be made therein without departing from the spirit and scope of the invention.

What is claimed is:

1. A concentric rotary transformer, for transmitting electrical signals between a stationary member and a rotary member comprising, in combination:

an inner core assembly for mounting to the rotary member, and an outer core assembly for mounting to the stationary member and positioned concentrically with the inner core assembly;

said inner core assembly including a core piece with a pair of displaced circumferential grooves machined about its outer surface;

a first coil, having two terminals and two legs, fabricated from a continuous conductor is positioned within said grooves;

said outer assembly including a core piece with a pair of displaced circumferential grooves machined about its inner surface; and a second coil, with two terminals and two legs, fabricated from a continuous conductor is positioned within the grooves of said outer core whereby the electrical signals are transferred as the inner core assembly rotates relative to the outer core assembly.

2. The device as claimed in claim 1 wherein the cores are fabricated from ferrite.

3. The device claimed in claim 1 wherein each core piece further includes an axial hole machined in each of said core pieces to interconnect the pair of displaced circumferential grooves, whereby the terminals of said coil are pulled through to establish a transmitting and receiving terminal.

4. The device as claimed in claim 3 further including electrical leads connected to the transmitting and receiving terminal.

5. The device as claimed in claim 4 wherein the electrical leads are connected to the transmitting and receiving terminal by soldering pads.

6. The device as claimed in claim 1 wherein the inner core assembly and the outer core assembly are separated by a predetermined air gap.

7. In a tape transport system wherein data is transferred between a stationary circuit means and a transducing means which is being positioned relative to a length of media by a rotating head wheel which is being positioned to abut upper and lower mandrel halves the improvement comprising in combination:

transfer means for transferring electrical signals between the transducing means and the stationary circuit means of said tape transport;

said transfer means including:

a first continuous coil having two spaced branches and positioned on the outer surface of a first core piece; and a second continuous coil having two spaced branches and positioned on the inner surface of a second core piece whereby the first core piece is positioned within the second core piece to form the transfer means.

8. The device as claimed in claim 7 further including:

first transmission means for transmitting electrical signals between the first continuous coil and the transducing means; and second transmission means for transmitting electrical signals between the second continuous coil and stationary circuit means.

9. The apparatus as claimed in claim 8 further including a first terminal pad operably attached to the first coil; and a second terminal pad operably attached to said second coil.

10. Magnetic tape transport comprising in combination:

an upper mandrel, a lower mandrel having a stationary circuit means mounted thereon, said lower mandrel being displaced and being axially aligned with said upper mandrel;

a rotating head wheel operably positioned between the upper and lower mandrels;

means for transporting said magnetic tape past said rotating head wheel;

transducing means operably positioned on said rotating head wheel;

shaft means operably connected to said head wheel, said shaft means being encircled by said lower mandrel;

drive means, operably associated with said shaft and connected to said lower mandrel to allow rotational motion of said shaft; and a printed circuit rotary transformer, including a rotary assembly operably associated with a fixed assembly for transmitting electrical signals between the stationary circuit means and the transducing means, said rotary assembly having a cylindrical core whereon a coil having spaced branches is wound from a continuous strand and said fixed assembly having a cylindrical core whereon a coil having spaced branches is wound from a continuous strand.

11. The device as claimed in claim 6 further including a first transmission means operably connected for transmitting electrical signals from said transformer means to the transducing means.

12. The apparatus as claimed in claim 11 further including second transmission means operably connected to said stationary coil.

13. The device as claimed in claim 12 further including terminal means operably connected to said lower mandrel.

14. A rotary transformer for coupling electrical signals to and from the rotating transducer of a tape transport unit having a rotor upon which the transducer is mounted, a rotating shaft interconnected to the rotor and a driving means with the rotating shaft journaled within a bearing means and constrained to rotate relative to a fixed support, said transformer comprising:

a rotary section connected to the rotating shift;

said rotary section having split windings positioned on a core piece with a common pole piece interposed between said split windings; and a stationary section mounted on the fixed support; said stationary section is positioned to be coaxial and in spaced relation with the rotary section and having split winding positioned on a core piece with a common pole piece interposed therebetween, whereby relative motion between the sections enables the coupling of the electrical signals.

15. A transfer device for transmitting electrical signals between a fixed section and a movable section of an electrical machine comprising in combination:

an outer core piece adapted for mounting to the fixed section;

said outer core piece being fabricated from a magnetic ring shaped material, with spaced grooves positioned about the circumference of the inner surface;

a printed circuit outer coil operably seated within the grooves of the outer core piece;

an inner core piece;

said inner core piece being fabricated from a magnetic ring shaped material with spaced grooves positioned about the circumference of the outer surface;

a printed circuit inner coil operably seated within the grooves of the inner core piece; whereby the inner core piece and the outer core piece are arranged concentrically.

* * * * *